Figure 1:
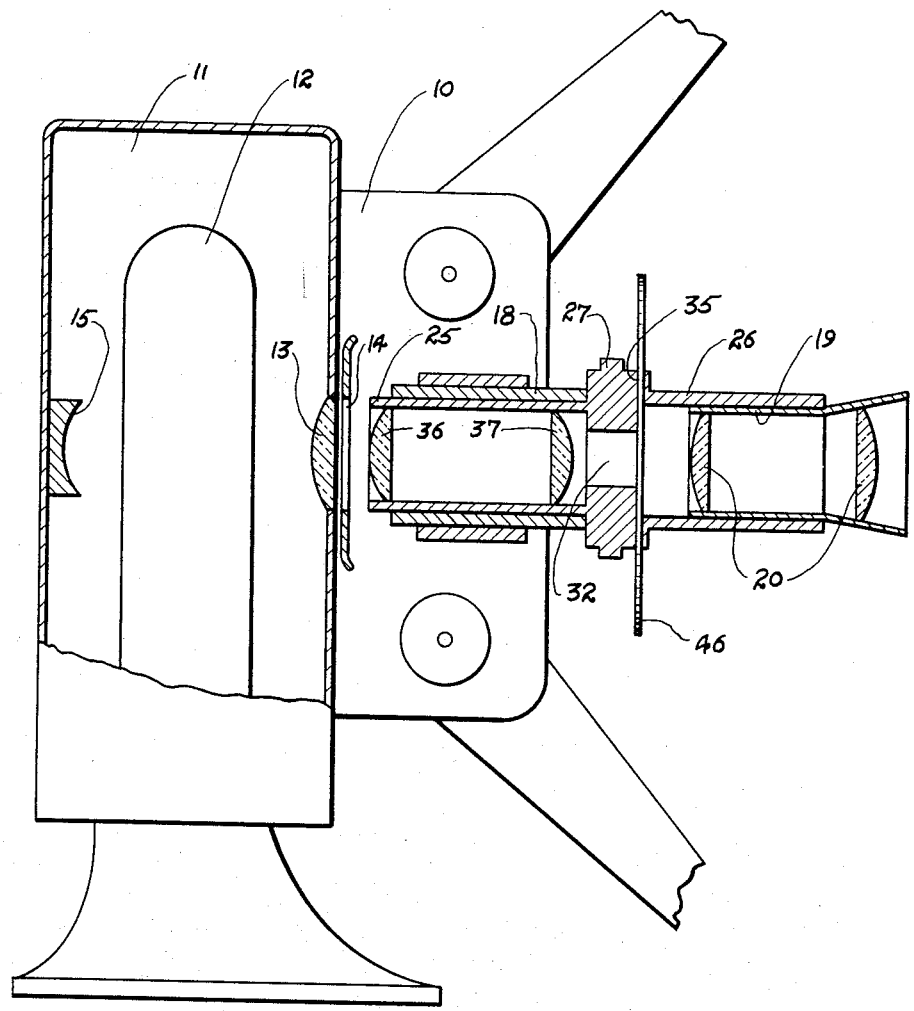

July 5, 1955 M. DIETMANN 2,712,268
STILL PICTURE ATTACHMENT FOR MOVING PICTURE PROJECTORS
Filed April 12, 1952 2 Sheets—Sheet 1

INVENTOR
MATTHIAS DIETMANN
BY
Fetherstonhaugh & Co.
ATTORNEYS

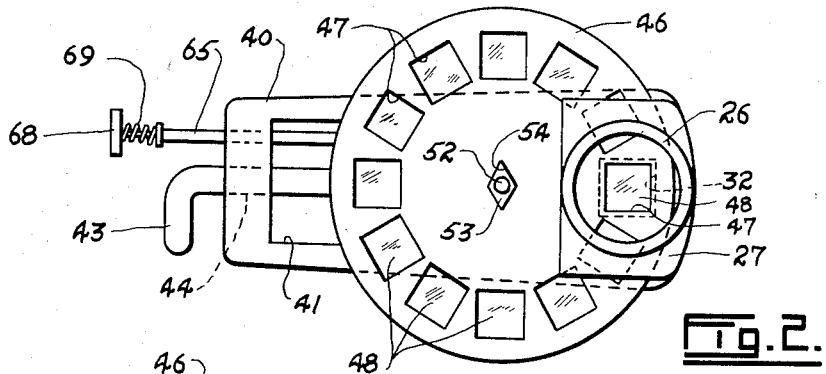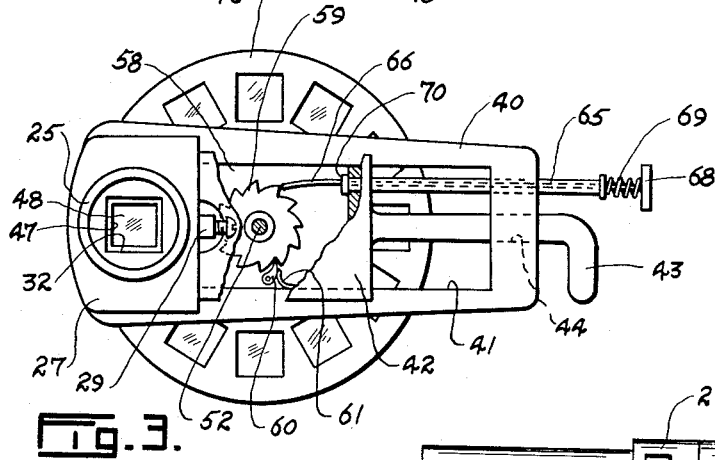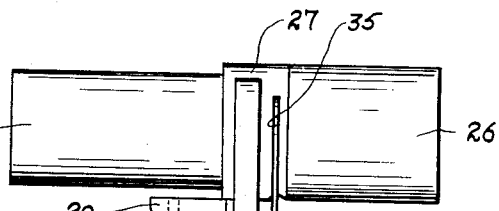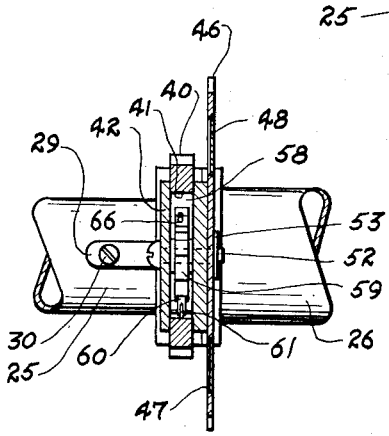

United States Patent Office 2,712,268
Patented July 5, 1955

2,712,268

STILL PICTURE ATTACHMENT FOR MOVING PICTURE PROJECTORS

Matthias Dietmann, Vancouver, British Columbia, Canada

Application April 12, 1952, Serial No. 282,027

7 Claims. (Cl. 88—27)

This invention relates to an attachment for moving picture projectors by means of which still pictures, such as slides and film frames, may be projected.

An object of the present invention is the provision of apparatus which will enable the high powered light source of a moving picture projector to be used for projecting still pictures.

Another object is the provision of still picture projecting apparatus which will enable smaller slides or film frames to be used than is possible with the known types of slide projectors, resulting in reduced cost and smaller equipment for storage and transportation.

A further object is the provision of apparatus for projecting still pictures which are much brighter than those of the slide projectors in common use today.

Yet another object is the provision of apparatus for projecting still pictures which utilizes a very high powered light source without danger of the slide or film being injured by heat.

The still picture attachment comprises aligned tubes, one of which is small enough to fit within the lens housing of a moving picture projector after the projection lens tube has been removed, and the other being large enough to receive said projection lens tube. A base is supported between these tubes and includes means for permitting the positioning of a slide or film frame between the aligned tubes at the longitudinal axis thereof. The smaller tube includes lenses for directing light from the light source of the projector through the slide or frame to the projection lenses, which in turn direct the image on to a screen. If desired, a plurality of slides or film frames may be mounted on a disc carried by the base. As this disc is rotated, the slides or films are moved into position between the aligned tubes. The disc may be turned by hand, or suitable means may be provided for moving one slide or frame into position each time it is operated.

As already stated, the attachment may be constructed to handle slides or film frames, but for the sake of convenience, it will be described in connection with the latter, and it is to be understood that the term "film" as used in this specification and the accompanying claims is intended to include slides and the like.

An example of this invention is illustrated in the accompanying drawings, in which, Figure 1 diagrammatically illustrates a moving picture projector, partly in section, with the still picture attachment in place, said attachment being in section longitudinally and having a film holder in place, Figure 2 is a front elevation of the attachment looking in the direction of the projector which has been omitted, Figure 3 is an elevation of the opposite side of the attachment, Figure 4 is a plan view thereof, and Figure 5 is an enlarged section taken substantially on the line 5—5 of Figure 4.

Referring to the drawings, 10 diagrammatically represents a moving picture projector having a housing 11 enclosing a high powered light source or lamp 12. A condenser 13 is located between the film gate illustrated at 14 and the lamp, while a reflector 15 is supported in the housing on the opposite side of the lamp from the condenser and in line with the latter. The usual film moving mechanism has been omitted for the sake of clarity. The projector has the usual tubular lens housing 18 supported in line with the condenser on the opposite side of the film gate therefrom. This housing normally supports a movable lens tube 19 including projection lenses 20. In this case, the lens tube has been removed from the housing 18 and is utilized in the still picture attachment in the manner hereinafter described.

The attachment includes aligned mounting and focusing tubes 25 and 26 projecting outwardly from the opposite sides of a base 27. The diameter of mounting tube 25 is a little less than that of focusing tube 26, and the former is adapted slidably to fit in the lens housing 18 of the projector, as shown in Figure 1. A lug 29 projects outwardly from the base substantially parallel with and spaced from the smaller tube, and has a set screw 30 which may be turned against the projector housing 18 firmly to hold the attachment in position. An opening 32 extends through the base 27 centered on the common longitudinal axis of the two tubes. This opening may have any desired cross sectional shape, and in the present example, it is substantially square, see Figure 3. A vertical slot 35 is formed in the base 27 extending transversely thereof and overlapping the opening 32 near the inner end of tube 26, said slot opening out from at least one edge of the base and extending almost to the opposite side thereof, see Figure 4. In this example, the slot opens out from three edges of the base. This slot is such that a film frame may be moved therein into line with the opening 32. One or more suitable lenses are provided within the tube 25 for directing a beam of light longitudinally of said tube. This may be accomplished by plano-convex lenses 36 and 37 adjacent opposite ends of the tube.

A support 40 projects outwardly from one side of the base 27 and has a relatively large, elongated opening 41 therein in which a carrier 42 is slidably mounted. A handle 43 projects outwardly from one end of the carrier through a passage 44 in one end of the support. This handle may be moved back and forth relative to the support to move the carrier towards and away from the base. When the carrier is in its innermost position, it bears against the base, as shown in Figures 3 and 4.

Suitable means is provided for holding a film frame within the slot 35 in registry with the opening 32 when the centre thereof adapted to fit over the boss. The shaft a film frame supporter 46 in disc form is provided having a plurality of holes 47 cut therein and arranged in a circular path. Film frames 48 containing desired pictures are secured to the disc, one at each of these holes.

The disc 46 is rotatably mounted on the carrier 42 in any convenient manner. In this example, a stub supporting shaft 52 is rotatably supported by the carrier and extends outwardly therefrom, said shaft preferably having a diamond-shaped boss 53 fixedly secured to the outer end thereof. The disc has a diamond-shaped hole 54 at the center thereof adapted to fit over the boss. The shaft and its boss are so located on the carrier that when the latter abuts against the base 27, the path of the film frames 48 extends across the frame opening 32 so that said frames may be moved one at a time into registry with the opening. While the disc 46 is preferably mounted on a movable carrier, it is to be understood that the carrier may be stationary, in which case the edge of each disc would be slipped into the base slot before the disc is placed on the boss 53.

The disc may be rotated manually, or if desired, suitable mechanism may be provided for moving the disc to position a different film in line with the opening 32 each time the mechanism is operated.

For this purpose, the carrier 42 may be hollow internally as at 58, see Figures 3 and 5. The stub shaft 52 extends into this hollow and has a ratchet wheel 59 fixedly mounted thereon against which a pawl 60 is pressed by a spring 61. A relatively long tube 65 extends from the outer end of the carrier 42 slidably through the outer end of the support 40. A long plunger 66 extends through and beyond the opposite ends of this tube. A button 68 is mounted on the outer end of the plunger, while a spring 69 extending between said button and the end of the tube normally urges the plunger into its outermost position, said position being limited by a stop 70 on the plunger within the carrier. This stop engages the end of the carrier normally to prevent the plunger from being withdrawn from the tube. The plunger normally extends into a notch of the ratchet wheel 59, see Figure 3.

When the button 68 is pressed inwardly towards the support 40, the plunger 66 turns the ratchet wheel 59 until the pawl 60 engages the next notch therein. When the button is released, spring 69 moves the plunger back so that its inner end springs into the next notch in the ratchet wheel. This movement of the ratchet wheel one notch is sufficient to move one film out of the opening 32 and another one into it.

In order to use the still picture attachment, the projection lens tube 19 of the moving picture projector is removed from the lens housing 18 and the smaller tube 25 is inserted into said housing. When the set screw 30 is tightened, the attachment is firmly retained in position. The lens tube 19 is then slid into the larger tube 25 where it may be used to focus the images on the screen in the usual manner.

The carrier 42 is moved to the outer end of the support 40 by means of the handle 43, and then a disc 46 with its films 48 is placed on the boss 53. When the carrier is moved to its innermost position, the disc is moved into the slot 35 in base 27 and one of its films is in registry with the opening 32, each film frame being the same size as or a little smaller than the opening. The button 68 may be pressed inwardly at intervals to move the films consecutively into registry with the opening.

Light from the lamp 12 is directed horizontally by the lenses 36 and 37 through the opening 32 and the films. The projected images are focused on the screen by moving the lens tube 19 inwardly or outwardly of the attachment tube 26. The condenser 13 and lenses 36 and 37 protect the film from heat so that a picture may be projected for any desired length of time without fear of the film being damaged. As the lamps of these moving picture projectors are very high powered, exceedingly clear images are projected on to the screen. This makes it possible to use very small films since the images may be magnified to any reasonable size without blurring.

Tubes 25 and 26 may be made any desired diameter so that the attachment can be applied to any moving picture projector. The fact that a number of film frames may be mounted on a small disc makes it possible to carry around or store a large number of these films in a comparatively small space. Many more of these films may be stored in a given space than is possible with ordinary slides which are capable of producing images comparable in size with those produced by the films with this equipment. As the light source is much stronger than those used in ordinary slide projectors, the images are much clearer than the regular slide images.

What I claim as my invention is:

1. A still picture attachment for moving picture projectors comprising aligned mounting and focusing tubes, a base between and connected to the tubes, the mounting tube being adapted to fit into the lens housing of a moving picture projector and the focusing tube slidably to receive the projection lens tube of said projector, an opening in the base extending across the common axis of the tubes, a transverse slot in and opening outwardly from an edge of the base, said slot overlapping the base opening, a carrier mounted adjacent the base, and a supporting shaft extending outwardly from the carrier spaced from the base and extending across the plane of the transverse slot, said shaft being adapted to receive a film frame supporter with the frames thereof arranged in a circular path and to position said path across the base opening.

2. A still picture attachment for moving picture projectors comprising aligned mounting and focusing tubes, a base between and connected to the tubes, the mounting tube being adapted to fit into the lens housing of a moving picture projector and the focusing tube slidably to receive the projection lens tube of said projector, an opening in the base extending across the common axis of the tubes, a transverse slot in and opening outwardly from an edge of the base, said slot overlapping the base opening, a carrier mounted adjacent the base, a supporting shaft extending outwardly from the carrier spaced from the base and extending across the plane of the transverse slot, and a film frame supporter removably mounted on the shaft and extending into the base slot, said frame supporter having a plurality of spaced openings therein arranged in a circular path and a film frame over each of said openings, and the supporting shaft being positioned to maintain the circular path extending across the base opening.

3. A still picture attachment for moving picture projectors comprising aligned mounting and focusing tubes, a base between and connected to the tubes, the mounting tube being adapted to fit into the lens housing of a moving picture projector and the focusing tube slidably to receive the projection lens tube of said projector, an opening in the base extending across the common axis of the tubes, a transverse slot in and opening outwardly from an edge of the base, said slot overlapping the base opening, a support connected to and extending outwardly from the base, a carrier slidably mounted on the support movable towards and away from the base, and a supporting shaft extending outwardly from the carrier across the plane of the transverse slot, said shaft being adapted to receive a film frame supporter with the frames thereof arranged in a circular path and to position said path across the base opening when the carrier is moved to its innermost position on the support with the film supporter extending into the base slot.

4. A still picture attachment for moving picture projectors comprising aligned mounting and focusing tubes, a base between and connected to the tubes, the mounting tube being adapted to fit into the lens housing of a moving picture projector and the focusing tube slidably to receive the projection lens tube of said projector, an opening in the base extending across the common axis of the tubes, a transverse slot in and opening outwardly from an edge of the base, said slot overlapping the base opening, a support connected to and extending outwardly from the base, a carrier slidably mounted on the support movable towards and away from the base, a supporting shaft extending outwardly from the carrier across the plane of the transverse slot, and a film frame supporter removably mounted on the shaft, said frame supporter having a plurality of spaced openings therein arranged in a circular path and a film frame over each of said openings, and said carrier when moved to its innermost position on the support moving the frame supporter into the base slot with the circular path extending across the base opening.

5. A still picture attachment for moving picture projectors comprising aligned mounting and focusing tubes, a base between and connected to the tubes, the mounting tube being adapted to fit into the lens housing of a moving picture projector and the focusing tube slidably to receive a projection lens tube, an opening in the base extending across the common axis of the tubes, a transverse slot in and opening outwardly from an edge of the base, said slot overlapping the base opening, a support connected to and extending outwardly from the base, an elongated opening in the support, a carrier slidably mounted in the support opening movable towards and away from the base, a handle extending outwardly from the carrier, a supporting shaft extending outwardly from the carrier across the plane of the transverse slot, and a film frame supporter removably mounted on the shaft, said frame supporter having a plurality of spaced openings therein arranged in a circular path and a film frame over each of said openings, and said carrier when moved to its innermost position on the support moving the frame supporter into the base slot with the circular path extending across the base opening.

6. A still picture attachment for moving picture projectors as claimed in claim 5 including a ratchet wheel fixed to the supporting shaft, a pawl engaging the ratchet wheel, and means extending clear of the support for turning the ratchet wheel one notch at a time.

7. A still picture attachment for moving picture projectors as claimed in claim 5 including a ratchet wheel fixed to the supporting shaft, a pawl engaging the ratchet wheel, a tube fixed at one end to the carrier and slidably extending through the outer end of the support, a plunger extending through and beyond the opposite ends of the tube, means for limiting the outward movement of the plunger, and spring means normally retaining the plunger in its outermost position, the inner end of said plunger normally extending into a notch in the wheel.

References Cited in the file of this patent

UNITED STATES PATENTS

| | | |
|---|---|---|
| 1,636,647 | Patterson | July 19, 1927 |
| 1,901,245 | Jones | Mar. 14, 1933 |
| 2,077,369 | Karp | Apr. 13, 1937 |
| 2,135,952 | Stephens | Nov. 8, 1938 |
| 2,438,333 | Dickman | Mar. 23, 1948 |
| 2,452,745 | Getter | Nov. 2, 1948 |
| 2,611,293 | Weiss | Sept. 23, 1952 |

FOREIGN PATENTS

| | | |
|---|---|---|
| 847,038 | France | June 19, 1939 |